United States Patent
Litwin, Jr.

(10) Patent No.: US 7,139,554 B2
(45) Date of Patent: Nov. 21, 2006

(54) USER-SELECTABLE STATUS INDICATION FOR CELLULAR COMMUNICATIONS DEVICES

(75) Inventor: Louis Robert Litwin, Jr., Plainsboro, NJ (US)

(73) Assignee: Thomson Licensing, Boulogne (FR)

( * ) Notice: Subject to any disclaimer, the term of this patent is extended or adjusted under 35 U.S.C. 154(b) by 385 days.

(21) Appl. No.: 10/178,820

(22) Filed: Jun. 24, 2002

(65) Prior Publication Data

US 2003/0236086 A1 Dec. 25, 2003

(51) Int. Cl.
*H04M 1/663* (2006.01)
*H04Q 7/22* (2006.01)

(52) U.S. Cl. .................. 455/412.2; 455/413; 455/414.1

(58) Field of Classification Search ............. 455/412.1, 455/413, 466, 517, 414, 412.2, 414.1
See application file for complete search history.

(56) References Cited

U.S. PATENT DOCUMENTS

| | | | |
|---|---|---|---|
| 6,131,046 A * | 10/2000 | Sano et al. ................. | 455/566 |
| 6,157,831 A * | 12/2000 | Lamb .......................... | 455/433 |
| 6,404,860 B1 * | 6/2002 | Casellini ................... | 379/88.17 |
| 6,424,841 B1 * | 7/2002 | Gustafsson ................. | 455/466 |
| 6,577,859 B1 * | 6/2003 | Zahavi et al. ............. | 455/412.1 |
| 6,741,678 B1 * | 5/2004 | Cannell et al. ........... | 379/88.14 |
| 2003/0078033 A1 * | 4/2003 | Sauer et al. ................ | 455/412 |

* cited by examiner

*Primary Examiner*—Joseph Feild
*Assistant Examiner*—S. Smith
(74) *Attorney, Agent, or Firm*—Joseph J. Laks; Robert B. Levy; Joseph J. Kolodka

(57) ABSTRACT

A system and method for providing a user-selectable status indication to incoming callers is provided, the system including a cellular communications device having a user-selectable status, and a server in signal communication with the cellular communications device for receiving the user-selectable status from the cellular communications device and for updating its logical database; and the corresponding method including the steps of providing a plurality of user-selectable statuses on a cellular communications device, receiving a status selection from a user of the cellular communications device, transmitting the user's status selection to a server, directing an incoming call for the user to the server if the user-selected status is not the Available status, and providing an indication to the incoming caller in accordance with the user's status selection.

30 Claims, 4 Drawing Sheets

USER-SELECTABLE STATUS INDICATION FOR CELLULAR COMMUNICATIONS DEVICES

BACKGROUND

The present disclosure relates to cellular communications and, in particular, to a system and method for providing a user-selectable status indication to incoming callers.

It is typical for a cellular telephone user to occasionally be unavailable to answer incoming calls. In cases of unavailability, such as, for example, when the user is in a meeting or a class, the user may turn off the telephone and/or the ringer. Thus, incoming callers generally have no idea whether the user is merely temporarily unavailable, or what the user's status might be. Although the user can typically leave a new voicemail when his/her status changes, that process is cumbersome and still requires the user to turn off the telephone and/or ringer when in a meeting or in a class.

SUMMARY

These and other drawbacks and disadvantages of the prior art are addressed by a system and method for providing a user-selectable status indication to incoming callers.

The system includes a cellular communications device having a user-selectable status, and a server in signal communication with the cellular communications device for receiving the user-selectable status from the cellular communications device and for updating its logical database.

The corresponding method includes the steps of providing a plurality of user-selectable statuses on a cellular communications device, receiving a status selection from a user of the cellular communications device, transmitting the user's status selection to a server, directing an incoming call for the user to the server if the user-selected status is not the Available status, and providing an indication to the incoming caller in accordance with the user's status selection.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for providing a user-selectable status indication to incoming callers in accordance with the following exemplary figures, in which.

DETAILED DESCRIPTION OF PREFERRED EMBODIMENTS

The present disclosure relates to cellular communications and, in particular, to a system and method for providing a user-selectable status indication to incoming callers when the callee is unavailable. Embodiments of the present disclosure store the user-selectable status locally and on a remote server, such as maintained by a service provider.

Figure 1:
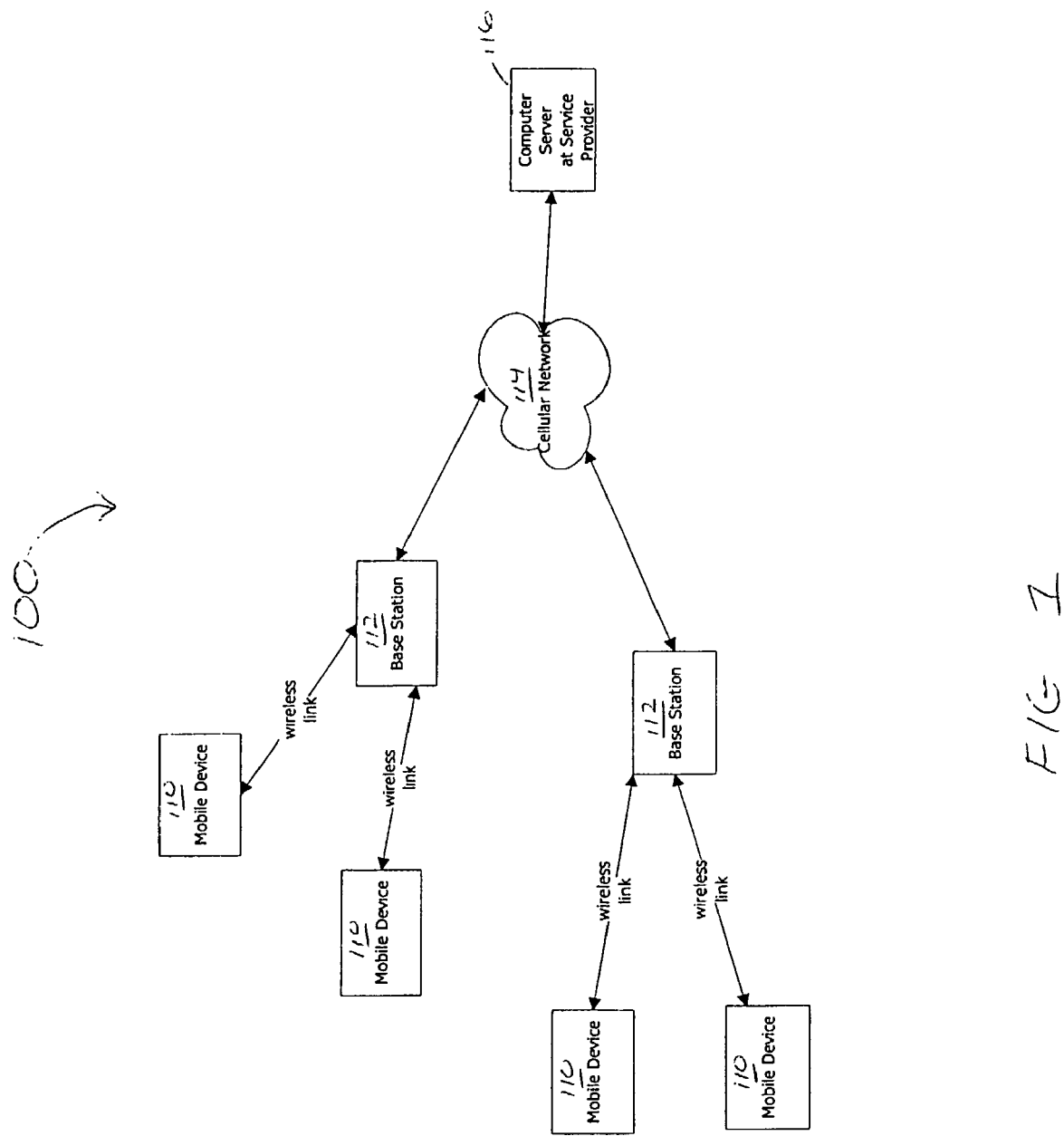
FIG. 1 shows a block diagram for a cellular communications system according to an illustrative embodiment of the present disclosure.

As shown in FIG. 1, a cellular communications system 100 includes cellular communications devices 110, such as, for example, mobile cellular telephones. The cellular communications devices 110 are each connected in signal communication to a base station 112 via the customary wireless links. Each base station 112, in turn, is connected in signal communication with a cellular network 114. A computer server 116, such as, for example, a server residing with a cellular service provider, is connected in signal communication with the cellular network 114. Thus, a communications path is formed between each cellular communications device 110 and the computer server 116.

Figure 2:
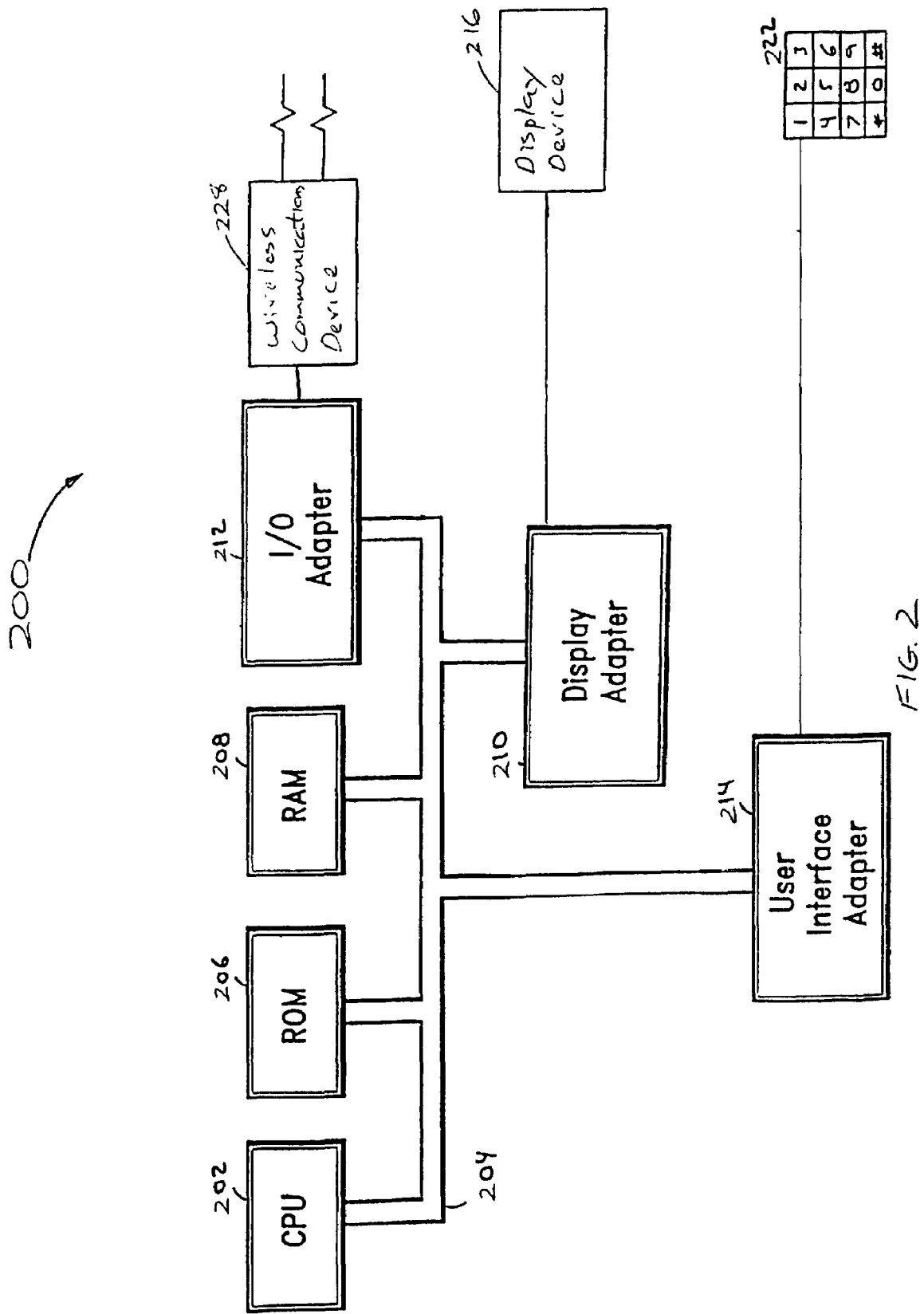
FIG. 2 shows a block diagram for a mobile cellular communications device usable in accordance with the system of FIG. 1.

Turning to FIG. 2, a cellular communications device is generally indicated by the reference numeral 200. The cellular communications device 200 may be embodied, for example, in a mobile cellular telephone according to embodiments the present disclosure. The cellular communications device 200 includes at least one processor or central processing unit ("CPU") 202 in signal communication with a system bus 204. A read only memory ("ROM") 206, a random access memory ("RAM") 208, a display adapter 210, an input/output ("I/O") adapter 212, and a user interface adapter 214 are also in signal communication with the system bus 204.

A display unit 216 is in signal communication with the system bus 204 via the display adapter 210, and a keypad 222 is in signal communication with the system bus 204 via the user interface adapter 214. The system 200 also includes a wireless communications device 228 in signal communication with the system bus 204 via the I/O adapter 212, or via other suitable means as understood by those skilled in the art.

As will be recognized by those of ordinary skill in the pertinent art based on the teachings herein, alternate embodiments of the cellular communications device 200 are possible. For example, alternate embodiments may store some or all of the data or program code in registers located on the processor 202.

Figure 3:
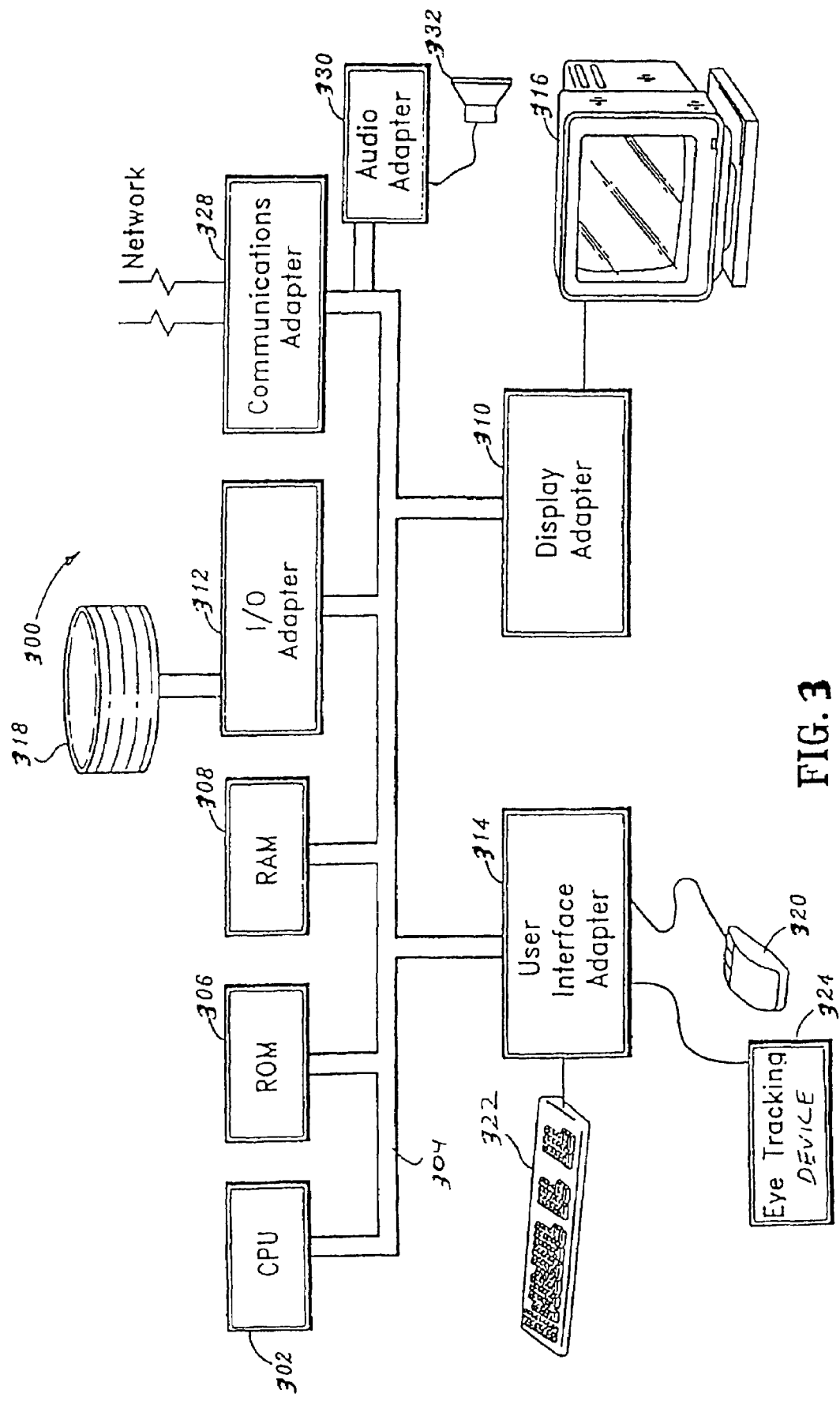
FIG. 3 shows a block diagram for a service provider computer server usable in accordance with the system of FIG. 1.

Turning now to FIG. 3, a service provider computer server is indicated generally by the reference numeral 300. The server 300 includes at least one processor or CPU 302 in signal communication with a system bus 304. A ROM 306, a RAM 308, a display adapter 310, an I/O adapter 312, and a user interface adapter 314 are also in signal communication with the system bus 304.

A display unit 316 is in signal communication with the system bus 304 via the display adapter 310. A data storage unit 318, such as, for example, a magnetic or optical disk storage unit or database, is in signal communication with the system bus 104 via the I/O adapter 312. A mouse 320, a keyboard 322, and an eye tracking device 324 are also in signal communication with the system bus 304 via the user interface adapter 314.

The system 300 also includes a communications adapter 328 in signal communication with the system bus 304, or via other suitable means as understood by those skilled in the art. The communications adapter 328 enables the exchange of data between the system 300 and a network, for example.

As will be recognized by those of ordinary skill in the pertinent art based on the teachings herein, alternate embodiments of the service provider computer server 300 are possible, such as, for example, embodying some or all of the computer program code in registers located on the processor chip 302. Given the teachings of the disclosure provided herein, those of ordinary skill in the pertinent art will contemplate various alternate configurations and implementations of elements of the server 300 while practicing within the scope and spirit of the present disclosure.

Figure 4:
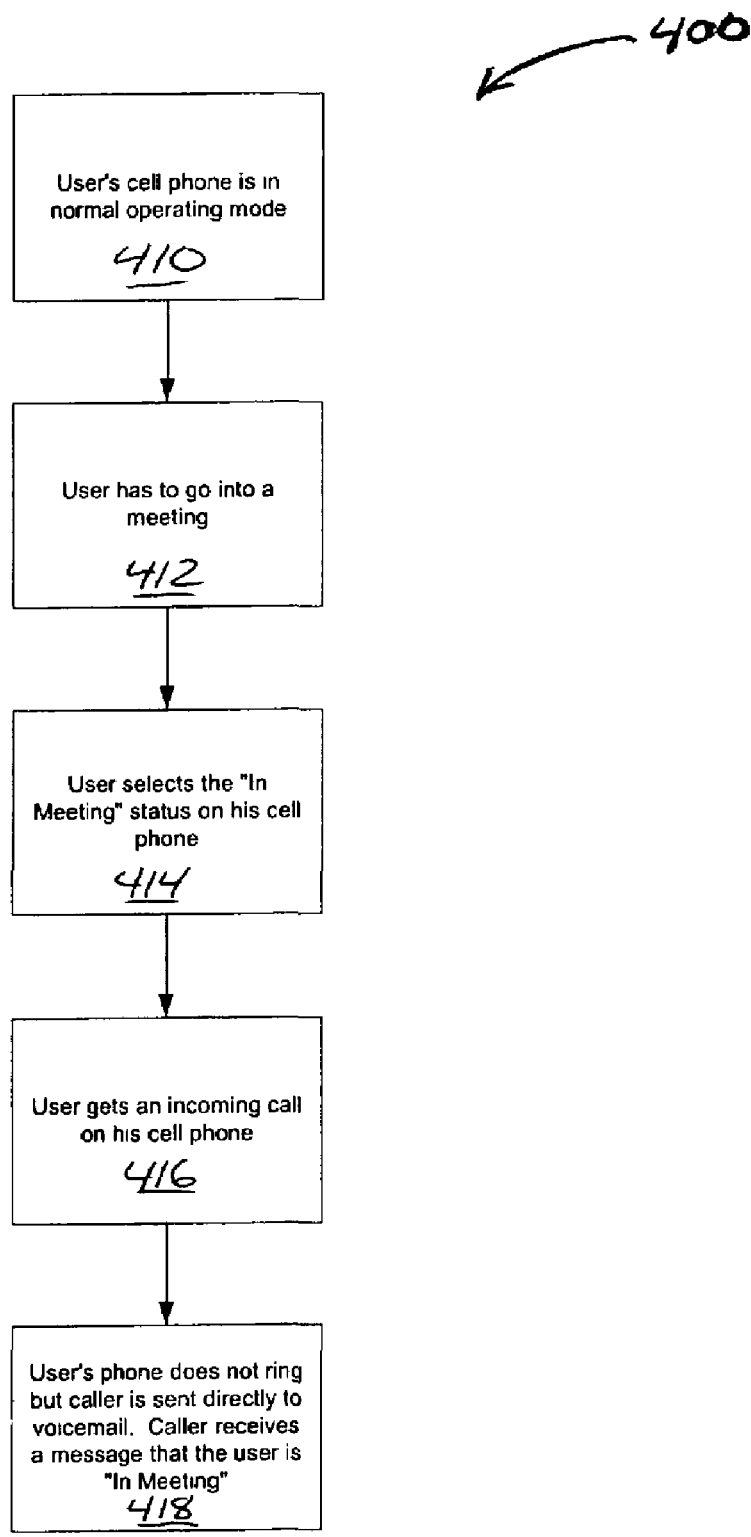
FIG. 4 shows a flow diagram for providing a user-selectable status indication to incoming callers in accordance with the system of FIG. 1.

As shown in FIG. 4, an exemplary state flow diagram for providing a user-selectable status indication to incoming callers is indicated generally by the reference numeral 400. In the exemplary scenario, a user's cellular telephone is in its normal operating mode at block 410. Then, the user has to go into a meeting at block 412. The user selects the "In Meeting" status on his/her cellular telephone at block 414, but leaves the telephone on. The user's cellular telephone receives an incoming call at block 416. Moving to block 418, the user's telephone does not ring, the call is directed to the user's voicemail system, and the caller receives an indication that the user is in a meeting in accordance with that user-selected status.

In operation, the method for providing a user-selectable status indication to incoming callers stores the status selection on the user's cellular telephone as well as in the database 318 of the service provider computer server 116, 300. The, the cellular communications devices or cellular telephones 110, 200 need not be in continuous signal communication with the system 100 in order for the server to provide the user's status to incoming callers.

Database information such as a user's status is stored on the service provider computer server 116, 300 as part of the database 318. This data can be automatically sent to the server 116, 300 by a user's cellular telephone contemporaneously with the user's selection of a new or changed status, as part of a database update. The cellular telephone keypad 222 is well suited for selecting a status from a list of choices.

The database status information is preferably sent to an incoming caller prior to recording any voicemail message from the caller. This can occur regardless of the location of the telephones 110, 200, as long as they have cellular service. The telephones 110, 200 may have two logical databases. One is a local logical database with status selection identifiers that are stored only on that telephone. The other is a global and/or group logical database that stores a user-selected status identifier and communicates this status to the service provider computer server 116, 300.

Embodiments of the present disclosure enable a user to quickly select different status settings from a cellular telephone. Examples of some preferred status settings are: Available, In a Meeting, In the Car, On a Plane, In Class, Out of Cellular Service Area, and Back in XX Minutes (where XX is a number that can be entered by the user).

When in the Available mode, the telephone operates normally. When in the other modes, an incoming call does not cause the telephone to ring. Instead, the caller hears the user's name, for example, followed by a message that indicates the user's status. In the case of "Back in XX Minutes", the telephone counts down the XX minutes. Thus, if a user selected "Back in 20 Minutes" and received an incoming call 5 minutes later, the incoming caller would receive a message that indicated "Back in 15 Minutes".

Therefore, a user of a cellular communications device having a user-selectable status indication in accordance with the present disclosure may select one of a plurality of settings on his cellular telephone to indicate his/her status. The user would select Available in order to receive calls or Unavailable. If the user selects Unavailable, then the user may also indicate the reason for his/her unavailability in accordance with a user-selectable status. In addition, the user may select a status timeout duration in order to automatically return the telephone to its normal operating mode after the specified period of time has elapsed. Optionally, the user status reported to incoming callers may indicate an expected time of user availability in accordance with the status timeout duration.

In a preferred embodiment, these user-selectable status settings can be changed quickly via a menu interface. The telephone will ring and behave as usual when in Available mode. In other Unavailable modes, the ringer can be automatically disabled. The incoming calls will be routed directly to voicemail and the incoming caller will receive a message indicating the status of the user.

In the case of a setting such as "Back in XX Minutes", the telephone and/or the server may automatically update the amount of time remaining until the user will become available. Thus, one caller might hear ". . . will return in 10 minutes" while someone who called later might hear ". . . will return in 3 minutes".

Various embodiments of the present disclosure permit a user to quickly select different status settings on his cellular telephone, such as, for example, Available, In a Meeting, In the Car, Back in 20 Minutes, and the like. When in Available mode, the telephone behaves as normal, including full operation of a ringer. When in the other modes, all incoming calls are routed directly to voicemail and the caller receives a message indicating the selected status of the user.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the system while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A system for providing a status of a user to incoming callers, the system comprising:
    a cellular communications device for providing at least one user-selected status, said communications device including a plurality of distinct status;
    a server for receiving the user-selected status from the cellular communications device prior to receiving incoming calls, wherein incoming calls are directed to the server if the user-selected status indicates the user is unavailable, the server providing a message to incoming callers in accordance with the user-selected status;
    means for receiving an entry from the user indicative of a status duration;
    means for updating a countdown timer in correspondence with the status duration; and
    means for providing an indication to the incoming callers in accordance with at least one of the status duration and the countdown timer.

2. A system as defined in claim 1, further comprising a cellular network in communication with the server and the cellular communications device.

3. A system as defined in claim 2, further comprising:
    a base station in communication with the cellular network and the cellular communications device.

4. A system as defined in claim 3, further comprising:
    a wireless link communication with the base station and the cellular communications device.

5. A system as defined in claim 1, further comprising:
    a plurality of cellular communications devices in communication with the server.

6. A system as defined in claim 1, wherein the server is a voicemail server.

7. The system of claim 1, wherein the user-selected status includes an entry from the user indicative of a status duration.

8. The system of claim 7, wherein at least one of the communications device or the server updates a countdown timer in correspondence with the status duration and provides an indication to incoming callers in accordance with at least one of the status duration and the countdown timer.

9. A system for providing a status of a user to incoming callers, the system comprising:
    means for providing a plurality of distinct status of a user on a cellular device;
    means for receiving a user-selected status from a user of the cellular communications device prior to receiving the incoming calls;
    means for transmitting the user-selected status of the user to a server prior to receiving the incoming calls, wherein when the incoming calls are received, further comprising:
    means for directing incoming calls for the user to the server if the pre-selected status indicates the user is not available;
    means for providing a message to the incoming callers in accordance with the user-selected status of the user;
    means for receiving an entry from the user indicative of a status duration;
    means for updating a countdown timer in correspondence with the status duration: and
    means for providing an indication to the incoming callers in accordance with at least one of the status duration and the countdown timer.

10. A system as defined in claim 9, wherein the plurality of distinct status comprises Available, In a Meeting, In the Car, On a Plane, In Class, Out of Cellular Service Area, and Back in a certain number of Minutes.

11. A system as defined in claim 9, further comprising means for receiving an entry from the user indicative of a status duration.

12. A system as defined in claim 9 wherein the means for providing the plurality of statuses comprises a means for displaying a menu interface on the cellular communications device.

13. A system as defined in claim 9, further comprising means for automatically disabling a ringer for status other than the Available status.

14. A system as defined in claim 9 wherein the server comprises a voicemail server.

15. A program storage device readable by machine, tangibly embodying a program of instructions executable by the machine to perform method steps for providing a user-selectable status indication to incoming callers, the method steps comprising:
    providing a plurality of status selectable by a user on a cellular communications device;
    receiving a user-selected status from a user of the cellular communications device prior to receiving the incoming calls;
    transmitting the user-selected status to a server prior to receiving the incoming calls, wherein when the incoming calls are received and the user-selected status indicates the user is not available, further comprising:
    directing the incoming calls for the user to the server; and
    informing the incoming callers in accordance with the user's status selection;
    the method steps further comprising:
    receiving an entry from the user indicative of a status duration;
    updating a countdown timer in correspondence with the status duration; and
    providing an indication to the incoming caller in accordance with at least one of the status duration and the countdown timer.

16. A program storage device as defined in claim 15 wherein the plurality of status comprises Available, In a Meeting, In the Car, On a Plane, is In Class, Out of Cellular Service Area, and Back in a certain number of Minutes.

17. A program storage device as defined in claim 15, the method steps further comprising receiving an entry from the user indicative of a status duration.

18. A program storage device as defined in claim 15 wherein the method step of providing the plurality of status comprises the method step of displaying a menu interface on a display of the cellular communications device.

19. A program storage device as defined in claim 15, the method steps further comprising automatically disabling a ringer for a status other than the Available status.

20. A program storage device as defined in claim 15 wherein the server comprises a voicemail server.

21. A method for providing a user-selectable status indication to incoming callers, the method comprising:
providing a plurality of user-selectable statuses on a cellular communications device;
receiving a user-selected status selection from a user of the cellular communications device prior to receiving the incoming calls;
transmitting the user's status selection to a server prior to receiving the incoming calls, wherein when the incoming calls are received and the user-selected status indicates the user is not available, further comprising:
directing the incoming calls for the user to the server; and
providing an indication to the incoming callers in accordance with the user's status selection; the method further comprising the steps of:
receiving an entry from the user indicative of a status duration;
updating a countdown timer in correspondence with the status duration; and
providing an indication to the incoming callers in accordance with at least one of the status duration and the countdown timer.

22. A method as defined in claim 21 wherein the plurality of user-selectable statuses comprises Available, In a Meeting, In the Car, On a Plane, In Class, Out of Cellular Service Area, and Back in a certain number of Minutes.

23. A method as defined in claim 21, further comprising receiving an entry from the user indicative of a status duration.

24. A method as defined in claim 21 wherein the step of providing the plurality of statuses comprises displaying a menu interface on the display of the cellular communications device.

25. A method as defined in claim 21, further comprising automatically disabling a ringer for a user-selected status other than the Available status.

26. A method as defined in claim 21 wherein the server comprises a voicemail server.

27. A system for providing a status of a user to incoming callers, the system comprising:
means for providing a plurality of distinct status of a user on a cellular device;
means for receiving a status from a user of the cellular communications device;
means for transmitting the status of the user to a server;
means for directing an incoming call for the user to the server if the status indicates the user is not available;
means for providing an indication to the incoming caller of the status of the user;
means for receiving an entry from the user indicative of a status duration;
means for updating a countdown timer in correspondence with the status duration; and
means for providing an indication to the incoming caller in accordance with at least one of the status duration and the countdown timer.

28. A system as defined in claim 27, wherein the means for providing the plurality of statuses comprises a means for displaying a menu interface on the cellular communications device.

29. A system as defined in claim 27, further comprising means for automatically disabling a ringer for status other than the Available status.

30. A system as defined in claim 27, wherein the server comprises a voicemail server.

* * * * *